Figure 1:
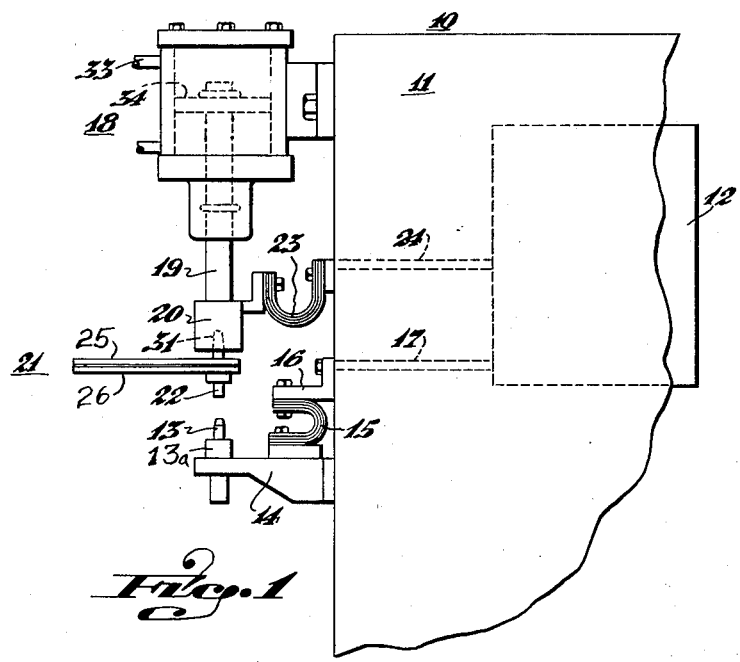

Dec. 9, 1958    L. W. MECKLENBORG    2,863,986
REPULSION MAGNETIC FORCE RESISTANCE WELDERS
Filed Oct. 4, 1957    2 Sheets-Sheet 1

INVENTOR.
Lawrence W. Mecklenborg
BY Gerald B. Tjoflat
His attorney

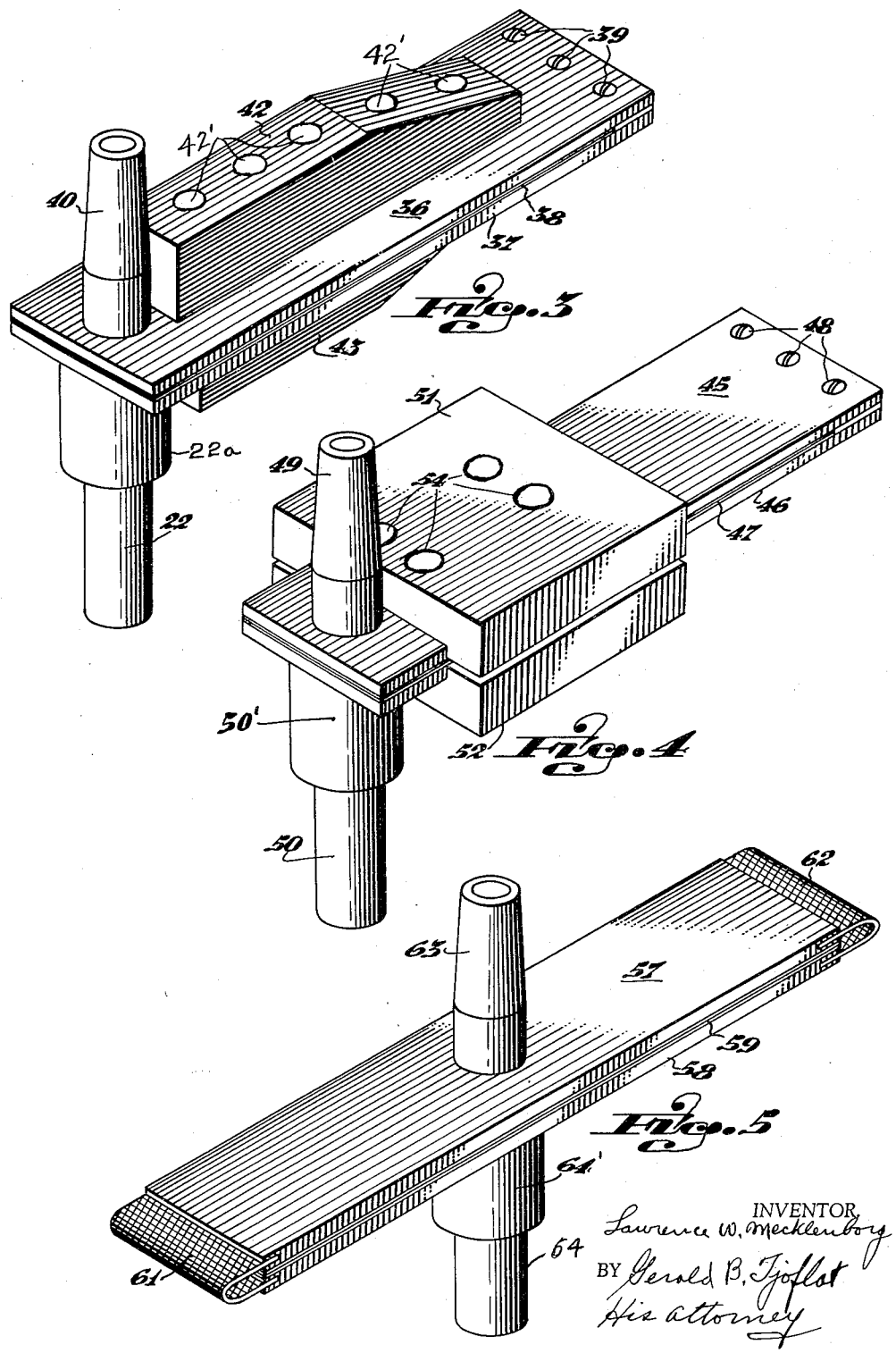

United States Patent Office 2,863,986
Patented Dec. 9, 1958

2,863,986

REPULSION MAGNETIC FORCE RESISTANCE WELDERS

Lawrence W. Mecklenborg, Cincinnati, Ohio, assignor to Precision Welder & Machine Company, Cincinnati, Ohio, a corporation of Ohio Application October 4, 1957, Serial No. 688,165

16 Claims. (Cl. 219—89)

This invention relates to magnetic force resistance welders, and more particularly to welders in which the force is developed by magnetic repulsion between parallel, substantially touching and coextensive conductors that carry the weld current, and one of the welder electrodes.

An object of this invention is to provide an assembly that comprises parallel, substantially coextensive conductors adapted to carry one of the electrodes, connect it to its electrode holder, and develop electrode weld pressure by magnetic repulsion when the weld current flows through the work.

Another object is to provide an electrode support and magnetic force developing assembly so constructed that it may be attached to the conventional electrode holder and substituted for the electrode thereof.

A further object is to provide an assembly as above set forth in which the force developing conductors are connected at one end in series circuit, the other ends being coupled to the electrode holder and the electrode, respectively.

A still further object is to provide an assembly as above set forth in which the adjacent opposite ends of the conductors are conductively coupled together, the middle portion of one carrying the electrode and the middle portion of the other being connected to the electrode holder, whereby when current flows through them they are separated by magnetic repulsion and develop weld pressure at the electrodes.

Other objects and advantages of the invention will be apparent to those of ordinary skill in the art to which the invention pertains from the following description and drawings.

In the drawings:

Figure 1 is a more or less fragmentary schematic view in side elevation of a resistance welder provided with a repulsion magnetic force developer embodying a form of the invention; and Figs. 2, 3, 4 and 5 are views in perspective of several modified forms of the invention.

In Fig. 1 of the drawings a resistance welder 10 is shown that comprises a frame 11 on which is mounted electric power supply equipment indicated generally at 12 for providing phase controlled electric current to the electrodes, whereby the magnitude and the duration of the flow of current to the weld are controlled as required by the work at hand.

The welder is provided with a relatively stationary electrode 13 supported by a knee or bracket 14 secured to the frame 11, that is connected through a flexible lead 15 and a bracket 16 to a power supply cable 17.

The welder includes an electrode positioner 18 such as a pneumatic or hydraulic cylinder having a piston rod 19 at the lower end of which is an electrode holder 20. The welder includes an assembly 21 to which a relatively movable electrode 22 is secured and by which the electrode is supported from the electrode holder 20.

The assembly 21 is so constructed that it can replace the conventional electrode which would be normally attached to the holder 20. It not only replaces the conventional electrode but it also develops magnetic force, when weld current flows, to supply the necessary and desired pressure on the weld.

The electrode holder 20 is connected through a flexible lead 23 and a cable 24 to the power supply source 12.

Figure 2:
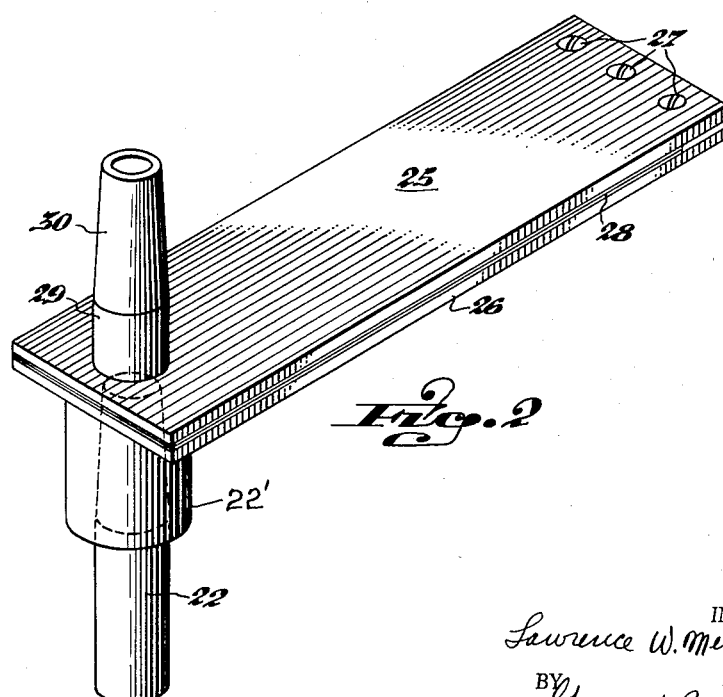

The assembly 21 is shown in perspective Fig. 2. It comprises parallel conductors 25 and 26. These conductors are relatively wide and may be made of bar copper or other suitable conducting material. Adjacent ends of members 25 and 26 are rigidly coupled together by means of screws or bolts 27. The opposite ends of members 25 and 26 are free and may separate or approach each other. In order that current may flow, without shunting, in opposite directions from the free end of member 25 to the free end of member 26, a thin layer of insulation 28 is placed between them as shown.

The free end of member 25 is provided with a pin 29 having a tapered portion 30 adapted to be received in a tapered socket 31 in the electrode holder 20. The free end of member 26 carries the electrode 22, which may be of conventional form and carried by an adapter 22' united by brazing, for example, to member 26.

When the power cylinder 18 is supplied with fluid pressure at port 33, the piston 34 therein moves the rod 19 and the assembly 21 downwardly until the electrode 22 engages work on the lower electrode 13. Therefore, when voltage is applied to the electrodes, current flows from the power supply lead or cable 24 into the electrode holder 20, and thence through the members 25 and 26, the electrode 22, the work and the lower electrode 13 back to the power supply. The current flowing in members 25 and 26 develops a magnetic repulsion force that separates the free ends of the members 25 and 26 thereby exerting pressure on the work through the electrode 22. This magnetic force results because the electrode holder 20 to which member 25 is secured is stationary.

In the event that the force developed on the electrodes is of such magnitude that the rod 19 is moved upwardly, thereby relieving the pressure on the work, the pressure may be maintained on the upper face of the piston or the piston rod may be locked in position once it has made engagement between the electrodes and the work. Also if the parts above the electrode holder are made relatively heavy so as to have substantial inertia, the electrode holder 20 may be restrained against upward movement as the result of the thrust of repulsion force developed between members 25 and 26.

Since the force of repulsion between two parallel conductors is a function of the length of the conductor, the magnitude of the current flowing and the spacing between the conductors, it is preferred that the space occupied by the insulation 28 be as short as possible.

In Figure 3, a modified form of electrode holder and repulsion force developer assembly is shown. That assembly comprises relatively wide conductors 36 and 37 having a relatively thin layer of insulation 38 between them. Adjacent ends of members 36 and 37 are rigidly secured by means of bolts or screws 39 while the opposite ends are free to deflect or pivot about the secured ends. The member 36 is provided with an adapter 40 by which the assembly of Fig. 3 may be secured to the electrode holder 20, in the same manner that the assembly 21 is secured thereto. The member 37 is provided with an electrode 22 mounted in an adapter 22a as in Figs. 1 and 2 and that electrode is disposed directly above and in alignment with the electrode 13.

In order to prevent bowing between the adapter 40 and the electrode 22 and the fixed ends of members 36 and 37, the latter may be provided with stiffening members 42 and 43 secured thereto with rivets 42', or other suitable means. It is preferred that the members 42 and 43 be nonmagnetic, and insulated from the bars 36 and 37 or they may be made of insulating material so long as sufficient stiffness and rigidity are provided. By stiffening the members 36 and 37, the characteristic of the weld pressure developed by the force of magnetic repulsion may be modified.

In Fig. 4 a still further modified form of magnetic force producing and electrode carrying assembly is shown. It comprises spaced, parallel, substantially coextensive conductors 45 and 46 having a thin layer of insulation 47 between them. They are rigidly secured at adjacent ends by means of screws 48 or other suitable means. The opposite ends are provided with an adapter 49 and an electrode 50, respectively. The electrode 50 may be mounted in an adapter 50'. The adapter 49 is designed to be accommodated in the receptacle in the holder 20 of Fig. 1.

In order to intensify the force of repulsion between members 45 and 46 when current flows to the work being welded, they may be provided with relatively heavy members 51 and 52 of magnetic material. As shown, members 51 and 52 are notched so as to receive the members 45 and 46 and are secured thereto by rivets 54 or equivalent means. The members 51 and 52 may be insulated from the members 45 and 46, respectively, with a thin layer of insulation, if necessary. The current flowing in the members 45 and 46 develops a magnetic field which appears to be intensified by the members 51 and 52 so that a greater repulsion force is developed between the conductors 45 and 46 and a greater pressure exerted upon the work between the electrodes.

In Figure 5 a further modification of the magnetic repulsion force developer and electrode holder is illustrated. It comprises parallel, coextensive bars of copper or other equivalent conducting material 57 and 58 which are insulated from each other by a layer of insulation 59. The opposite ends of the members 57 and 58 are conductively coupled by means of flexible conducting straps 61 and 62. The straps 61 and 62 may be of woven conducting strands of copper, for example. The opposite ends of the members 57 and 58 are slotted to receive the ends of members 61 and 62 so that they may be firmly connected thereto by soldering or brazing.

In the form shown in Fig. 5, both ends of members 57 and 58 are anchored so that the maximum deflection between them will occur at about the middle thereof. Therefore, the adapter 63 by which the assembly may be attached to the electrode holder 20 of Fig. 1 is placed at about the longitudinal center of member 57 and the electrode 64 is attached by its holder 64' to member 58 directly below member 63.

The assembly of Fig. 5 when attached to the electrode holder 20 may be placed at right angles to the position occupied by assembly 21 of Fig. 1 so as to provide adequate space between the assembly and the frame of the machine or other parts of the welder.

While the repulsion magnetic force developer and the electrode holder assembly has been shown and described as being carried by the electrode positioner 18, it will be appreciated that these devices may also be mounted on the knee or bracket 14. In that case the stationary electrode 13 would be replaced by the electrode of the assembly by merely fitting the adapter thereof into the holder 13a of electrode 13.

From the foregoing it will be apparent that a relatively simple and unique structure has been disclosed for developing magnetic force on the work being welded between resistance welder electrodes. The assembly includes not only the magnetic force producing means, but also provides the means whereby the assembly may be attached to the conventional electrode holder of either the stationary or the movable one without making a change in the design or construction of the machine.

Having thus described the invention, it will be apparent to those of ordinary skill in the art to which the invention pertains, that various modifications and changes may be made without departing from either the spirit or the scope of the invention.

Therefore, what is claimed as new and desired to be secured by Letters Patent is:

1. A magnetic repulsion force developing device for resistance welders having means for relatively moving the welder electrodes to or from work engaging position, said device comprising parallel, substantially touching and coextensive conductors having a relatively thin layer of insulation between them and connected to each other so as to carry the weld current through them in opposite directions, one of said conductors having means for connecting the device to said electrode moving means and the other conductor having one of the welder electrodes secured thereto, the conductors separating by magnetic repulsion to exert weld pressure through the electrode on the work.

2. A resistance welder having a pair of spaced electrodes and a positioner for moving one of the electrodes relative to the other to or from work engaging position, and a magnetic force producing means comprising parallel, insulated, substantially touching and coextensive conductors connected to be traversed in opposite directions by the weld current, one of them being coupled to the positioner and the other having the relatively movable electrode secured thereto, whereby, when the positioner engages its electrode with the work and weld current flows, the conductors are repelled by the magnetic field about them thereby exerting weld pressure on the work.

3. A device as in claim 1 in which the parallel conductors are relatively wide, flat members secured at adjacent ends, one member being connected at a location adjacent the other end to said moving means, the relatively movable electrode being secured to the other conductor member in alignment with said positioning means.

4. A device as in claim 1, in which the conductors are relatively wide members, the opposite ends of which are secured to each other, one member being coupled to the positioner means at a location substantially midway between the ends thereof and the relatively movable electrode is secured to the other conductor member at a location substantially midway between the ends thereof.

5. A device as in claim 1 in which each of the conductors has a rigidifying member secured thereto.

6. A device as in claim 5 in which the rigidifying members are of magnetic material.

7. A resistance welder as in claim 2 in which the conductors are relatively wide, flat members secured at adjacent ends, one member being connected at a location adjacent the other end to said positioner, the relatively movable electrode being secured to the other conductor member in alignment with said positioner.

8. A resistance welder as in claim 2 in which the conductors are relatively wide members, the opposite ends of which are secured to each other, one member being coupled to the positioner at a location substantially midway between the ends thereof and the relatively movable electrode is secured to the other conductor member at a location substantially between the ends thereof.

9. A device as in claim 2 in which each of the conductors has a rigidifying member secured thereto.

10. A device as in claim 9 in which the rigidifying members are of magnetic material.

11. A magnetic force producing and welder electrode assembly for a resistance welder comprising parallel, insulated, substantially touching coextensive conductors electrically connected to carry weld current in opposite directions when the work is engaged by the electrodes, one of said conductors being provided with means for attachment to the electrode holder of a welder and the other conductor having an electrode carried thereby in circuit therewith, whereby, when the electrode is engaged by work to be welded, the conductors are separated by magnetic repulsion to thereby exert weld pressure on the work.

12. An assembly as in claim 11 in which one end of one conductor is secured to the adjacent end of the other conductor, the other ends being free, the free end of one conductor being provided with the means of attachment to the electrode holder and the free end of the other carrying the welder electrode.

13. An assembly as in claim 11 in which the conductors are relatively wide and flat, and having a thin layer of insulation between them extending from their free to their connected ends.

14. An assembly as in claim 11 in which each conductor is provided with a rigidifying member to cause the conductors to remain substantially straight as they separate about the connected ends as a pivot.

15. An assembly as in claim 14 in which the rigidifying members are of magnetic material.

16. An assembly as in claim 11 in which the conductors are flat and relatively wide, and connected to each other at both ends to provide a parallel current flow circuit, and that one member is coupled to the electrode holder, while the other member carries the welder electrode, said electrode being located about midway of the ends of the conductors in alignment with the electrode holder.

References Cited in the file of this patent

UNITED STATES PATENTS

| | | |
|---|---|---|
| 1,350,734 | Overlin | Aug. 24, 1920 |
| 1,434,374 | Lemon et al. | Nov. 7, 1922 |
| 2,049,312 | Palmer | July 28, 1936 |
| 2,382,711 | Hagedorn | Aug. 14, 1945 |
| 2,386,261 | Redmond | Oct. 9, 1945 |